United States Patent Office 3,386,776
Patented June 4, 1968

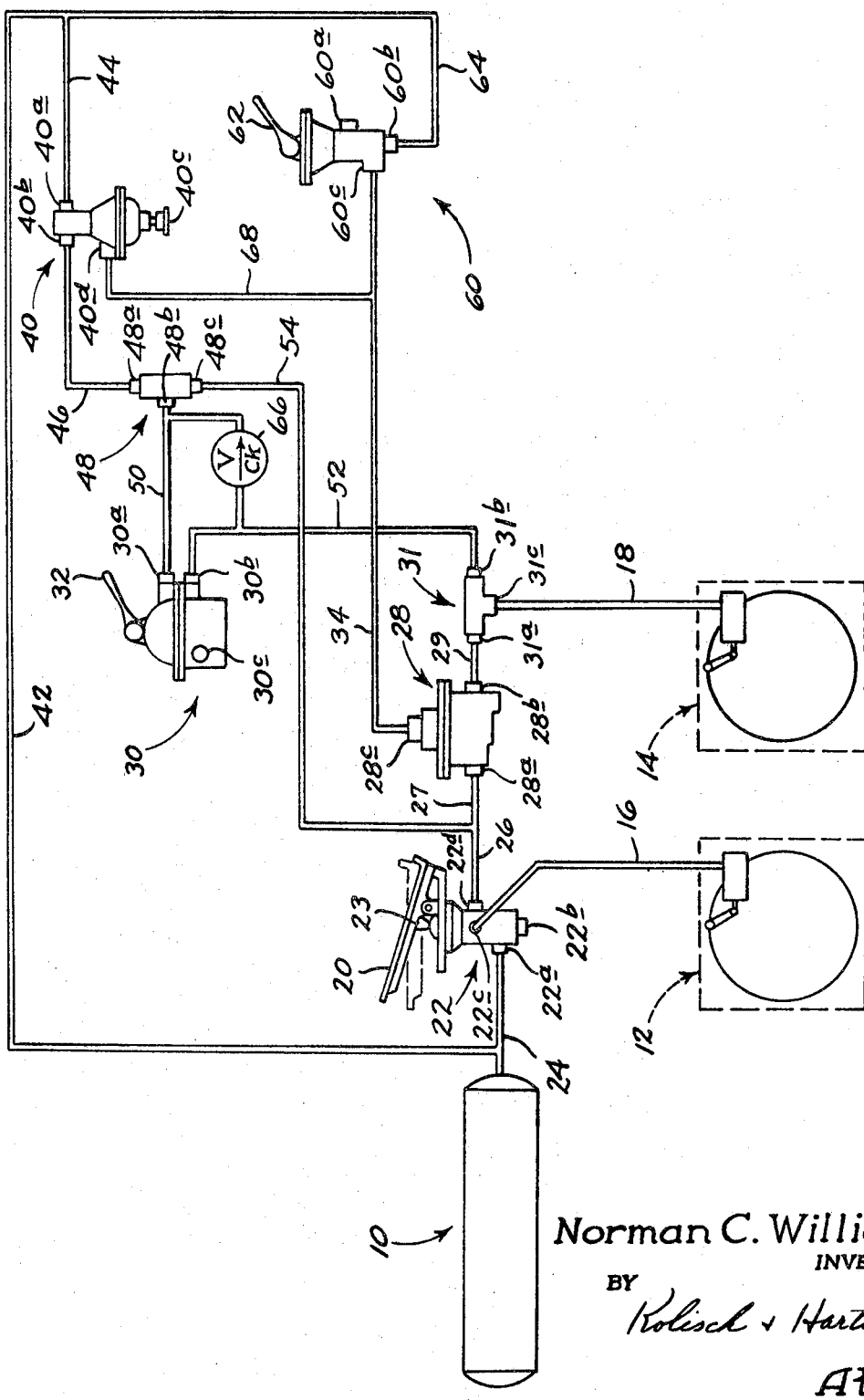

3,386,776
VEHICLE BRAKING SYSTEM
Norman C. Williams, Portland, Oreg., assignor to Power Brake Equipment Company, Portland, Oreg., a corporation of Oregon
Filed June 13, 1966, Ser. No. 557,046
5 Claims. (Cl. 303—7)

ABSTRACT OF THE DISCLOSURE

Apparatus for controlling the pressure of fluid supplied from a pressure tank to a vehicle wheel brake assembly including a line connecting the tank with a variable pressure regulating valve, and conduit means connecting the downstream side of the valve to the brake assembly, said conduit means including a second variable pressure regulating valve hydraulically in series with the first-mentioned valve. A circuit changing valve is provided which is actuatable to remove the second variable pressure regulating valve from its in-series relationship with the first-mentioned valve and to place it in parallel with the first-mentioned valve between the tank and the brake assembly.

---

This invention relates to vehicle braking systems generally, and more particularly, to a braking system featuring, in combination with the usual foot pedal (more specifically treadle in larger vehicles) which actuates the brakes, adjustable means permitting a driver to place a maximum limit on the force utilized to actuate a brake assembly in the vehicle. As contemplated herein, the braking system may be incorporated with a vehicle, such as a tractor-trailer combination, with the adjustable means referred to utilized by the driver for the purpose of controlling the braking effort exerted by brake assemblies in the trailer portion of the vehicle.

Further explaining a specific embodiment of the invention, in a vehicle comprising a tractor drawing a trailer, the braking effort exerted by brake assemblies for the trailer wheels should not always bear the same relationship to the braking effort exerted by brake assemblies for the tractor wheels under all load and road conditions. For example, with a fully loaded trailer, on actuation of the vehicle braking system a considerable braking effort is desirable in the brake assemblies for the trailer wheels with relation to the effort exerted by assemblies of the tractor wheels, for the trailer to be properly retarded, to prevent jackknifing, etc. On the other hand, with the trailer unloaded, with the same braking effort exerted by the brake assemblies for the wheels of the tractor, a considerably smaller braking effort is desirable in the brake assemblies for the trailer, if the wheels of the trailer are to be prevented from tending to lock so that the trailer because of its light load then hops down the road.

Several different types of systems have been proposed to permit a vehicle driver to control to a degree the braking effort exerted by different brake assemblies. These, however, have not been entirely satisfactory, either by reason of certain deficiencies in the type of control rendered by the system, lack of fast response in the various brake assemblies which make up the system, or the fact that special valves and extensive hose connections are required for the system to operate properly. The latter, of course, is undesirable, if for no other reason than that it adds considerably to the total cost of the vehicle braking system.

Thus, a general object of this invention is to provide an improved vehicle braking system, which permits a driver to control the extent of the braking effort exerted by certain brake assemblies in a vehicle combination.

More specifically, the invention contemplates as an object thereof the provision, in the braking system of a vehicle, and in combination with the usual pedal or treadle which operates the braking system, adjustable control means permitting the vehicle driver to limit the braking effort exerted by certain brake assemblies in the vehicle on actuation of the brake pedal.

The principles of the invention are applicable to air pressure as well as vacuum systems.

A specific object of the invention is to provide a braking system which includes a valve adjusted by change in foot pedal position, and thus referred to as a "foot valve," effective by an adjustment made therein to produce a change in the pressure existing in various lines which connect with the vehicle brake assemblies, and another valve constituting a control valve or control means in the system which is in series with the foot valve between the foot valve and the line connecting with the trailer brake assemblies, which other valve may be utilized to limit the pressure changes occurring in said line on actuation of the foot valve. The invention further features means whereby this other valve may be removed from its in-series position, if such as desired by the driver of the vehicle. More specifically, the invention contemplates means including a circuit changing valve operable to connect the foot valve directly with the service line for the trailer brake assemblies, with the control valve referred to paralleling the foot valve. With this organization, the control valve may be actuated independently to produce the actuation of the trailer brake assemblies. The foot valve may also be actuated by operation of the foot pedal, and the braking effort exerted by the brake assemblies for the trailer wheels is determined by that one of the two valves which produces greatest change in the pressure condition in the service line.

These and other objects and advantages of the invention will become more fully apparent as the following description is read in conjunction with the accompanying drawing, which illustrates schematically a braking system for a vehicle, as contemplated herein, which system utilizes compressed air as a medium producing actuation of the vehicle brakes.

Referring now to the drawing, the braking system illustrated is of the type that may be incorporated with a vehicle comprising a tractor and trailer, with the system enabling the driver, at his option, to limit the braking effort exerted by the brake assemblies for the trailer. With heavy duty vehicles comprising a tractor and one or more trailers, it is common to utilize compressed air as the medium for producing brake actuation, and a tank containing such a supply of compressed air is illustrated schematically at 10. It should be understood, of course, that the vehicle would also include the usual compressor for replenishing compressed air to the tank, but such has been omitted from the drawing for reasons of simplicity.

Indicated schematically at 12 and 14 are brake assemblies, also referred to herein more simply as brakes, for the tractor and trailer portions of the vehicle combination, respectively. The construction of these brakes is conventional and particulars of the construction form no part of the present invention. Suffice it to say that each brake includes the usual ram or piston cylinder which is actuated by the introduction of air under pressure thereto to brake the wheel. The rams are single acting, and with the exhaust of air pressure therefrom the brake is released. In the drawing only one brake is shown for the tractor and one for the trailer, the other brake or brakes which normally would be provided for the tractor and trailer having been eliminated also for reasons of simplicity. The line or hose through which air under pressure is supplied the brake for the tractor (and through which exhaust of air takes place) is shown at 16. The line or hose servicing the brakes for the trailer, also referred to herein as a service line, is shown at 18.

A pedal 20, more specifically a swiveled treadle, is operated by the vehicle driver to actuate the brakes. As illustrated in the figure, the treadle is mounted directly above a foot valve 22 and includes a portion 23 mounted on the spool of the valve operable to adjust spool position on actuation of the treadle. Foot valve 22 is a variable, pressure regulating valve, and includes an inlet port 22a, an exhaust port 22b connecting with the atmosphere providing an exhaust, and a pair of pressure regulated ports 22c, 22d on the downstream side of the valve. With treadle 20 in its normal raised position, as shown in solid outline, inlet port 22a is closed off within the valve, and ports 22c, 22d are connected within the valve to exhaust port 22b. With pressing of the treadle and shifting of the same downwardly, to the position shown in dashed outline, inlet port 22a is connected to both pressure regulated ports, and exhaust port 22b is closed off.

The variable, pressure regulating valve is conventional and includes the usual spring biased member within the valve producing with the treadle depressed a constant pressure in ports 22c, 22d, which pressure under normal operating conditions is somewhat less than the total available air pressure in tank 10. The level of the pressure at these ports is changed by adjusting treadle position. The greater the extent that treadle 20 is depressed, the higher the level of the regulated pressure appearing at ports 22c, 22d. The valve provides through port 22b an exhaust for ports 22c, 22d, for any air under pressure downstream from these ports where the pressure of such air is above the regulated pressure level of the valve. With the treadle fully raised, ports 22d, 22c are open to the atmosphere through exhaust port 22b.

Tank 10, also referred to herein as a source of pressure maintained at non-atmospheric level, is connected to inlet port 22a by means of a conduit or line 24. Line 16 described in connection with the actuation of the tractor brakes is shown connected to pressure regulated port 22c. Connected to pressure regulated port 22d is a line or conduit 26, which supplies air under pressure to the service line connected to the trailer brakes in a manner to be more particularly described.

Shown at 30 is another variable pressure regulating valve, also referred to herein as a control valve or means. This valve is actuated by a hand lever 32 instead of the treadle described in connection with foot valve 22. The valve includes an inlet port 30a, a pressure regulated port 30b, and an exhaust port 30c. The valve is similar in functioning to pressure regulating valve 22, and like the earlier described regulating valve is operable to produce in port 30b on actuation of the hand lever a regulated pressure which is normally something less than the pressure existing in inlet port 30a. The extent to which the hand lever is actuated determines the level of the regulated pressure which is produced in port 30b.

At the option of the vehicle driver, hand operated control valve 30 may be employed for the actuation of the brakes in the trailer to produce a greater air pressure in service line 18 than may exist in line 16 supplying the tractor brakes by reason of actuation of foot valve 22. This functioning is made possible by the inclusion of circuitry which, in effect, places control valve 30 in parallel with foot valve 22, whereby an alternate path for air under pressure is provided to service line 18 through the control valve.

Further explaining, connecting line 26 with service line 18 is conduit means comprising conduit or line 27, a pilot operated pressure holding valve 28, a conduit or line 29, and a two-way check valve 31. Pressure holding valve 28 includes a pair of ports 28a, 28b which communicate with each other in the absence of any pressure in a third or pilot port 28c to which is connected pilot line 34. Upon the introduction of air under pressure into this pilot line the valve is adjusted to block air flow from port 28a to port 28b, while permitting air flow from port 28b to port 28a.

Two-way check valve 31 includes three ports comprising inlet ports 31a, 31b, and outlet port 31c. Within the valve is a conventional shuttle spool (not shown) which travels away from the particular inlet port which is exposed to the higher pressure, to close the other of the inlet ports which is exposed to a lower pressure, and at the same time to connect the inlet port exposed to higher pressure to outlet port 31c.

With the structure described, and assuming atmospheric pressure to be existing in port 31b of the two-way check valve and in pilot port 28c of the pressure holding valve, the driver may actuate both the tractor and trailer brakes, with air under pressure introduced to lines 16 and 18 at the same pressure level, by actuation of foot valve 22. Such actuation produces a regulated pressure in port 22c connected directly to line 16, and port 22d connected to the service line through the pressure holding valve and the two-way check valve.

Shown at 40 is a relay valve, also referred to herein as a circuit changing valve, including an inlet port 40a, an outlet port 40b, an exhaust port 40c, and a pilot port 40d. In the absence of any pressure exceeding atmospheric in the pilot port the valve is open, with ports 40a, 40b communicating with each other through the valve, and with the exhaust port closed off. With air under pressure introduced to the pilot port of the valve, the inlet port closes, and port 40b becomes connected to the exhaust port.

As illustrated in FIG. 1, port 40a of the relay valve is connected to line 24 through conduits or lines 42, 44. Port 40b of the valve is connected to a line or conduit 46 which extends to an inlet port 48a of a two-way check valve 48 similar to valve 31 already discussed. The outlet port 48b of this valve is connected through conduit or line 50 to inlet port 30a of valve 30. Pressure regulated port 30b of this valve is connected to inlet port 31b of two-way check valve 31 by line or conduit 52. Two-way check valve 48 has another inlet 48c, which is connected to line 26 through a line or conduit 54.

The operation of the circuitry just described, and how the control valve may be used to produce a greater pressure in service line 18 than exists in line 16, will now be described. Assuming that pilot port 40d of the relay valve is at atmospheric pressure, should the vehicle driver actuate hand lever 32 of control valve 30 without depressing the treadle of the foot valve, a regulated pressure results in service line 18 which directly corresponds to the degree of actuation of the control valve. This is by reason of the fact that relay valve 40 is open so that line 46 reflects the pressure of tank 10, and two-way check valve 48 is in a position connecting port 48a with port 48b (line 54 being at atmospheric and thus a lower pressure than line 46 by reason of its communication with exhaust port 22b of the foot control valve), so that the pressure of the source is applied to inlet port 30a of the control valve. The regulated pressure which appears at regulated port 30b is transmitted to the service line through conduit or line 52 and valve 31. If the vehicle driver should actuate foot valve 22 to depress it slightly, and to produce a regulated pressure in ports 22c, 22d less than the pressure existing in regulated port 30b of the control valve, then the regulated pressure produced by the foot valve is reflected in line 16 leading to the tractor brakes, whereas the regulated pressure produced by adjustment of hand operated control valve 30 is reflected in service line 18 leading to the trailer brakes. Should the foot valve be adjusted to establish a regulated pressure in regulated ports 22c, 22d greater than the regulated pressure produced in port 30b of valve 30, then the higher pressure or the one established by the foot valve will be reflected in both lines 16 and 18. The control valve, therefore, provides a means which may be actuated under certain circumstances, as for instance when the vehicle trailer is carrying a heavy load, to produce in the trailer brakes a greater braking effort than is produced in the tractor brakes.

This invention contemplates in the organization so far described novel means for in effect changing the position of the control valve, whereby instead of being in parallel with the foot valve as just described, the valve assumes an in-series relationship with respect to the foot valve, with the control valve being located toward service line 18 from the foot valve. With such an organization, the braking system is suited for the braking of the vehicle where it is desired to have a lesser braking effort exerted by the trailer brakes than by the tractor brakes. The control valve 30 in other words enables a limit to be placed on the braking effort produced by the brakes of the trailer.

Further explaining, shown at 60 is a conventional three-way valve, which includes an exhaust port 60a, an inlet port 60b, and an outlet port 60c. The valve is manipulated by handle 62. The valve constitutes an on-off valve in the organization, and in its normal "off" position outlet port 60c is connected to exhaust port 60a and inlet port 60b is closed. In its "on" position, ports 60c and 60b are connected together, and port 60a is closed. The valve, it will be noted, has its inlet port connected through conduit or line 64 to conduit 42 connecting with the source of air pressure. Outlet port 60c is connected to the pilot port of pressure holding valve 28 through conduit or line 34, and to pilot port 40d of circuit changing valve 40 through conduit or line 68.

In explaining now how the apparatus described may be utilized with valve 30 functioning to limit the braking effort which occurs in the trailer brakes, on-off valve 60 through manipulation of handle 62 is placed in its "on" position. With this adjustment, air under pressure from tank 10 is introduced to line 68, and as a consequence relay or circuit changing valve 40 is adjusted to connect line 46 with the atmosphere through exhaust port 40c, and to close port 40a. With the on-off valve in its "on" position, air under pressure from tank 10 is also introduced to line 32, which is the pilot line for pressure holding valve 28. This adjusts the pressure holding valve whereby it prevents flow from port 28a to port 28b while accommodating flow in the reverse direction. After these various adjustments, on depressing of the treadle and air under pressure passing through the foot valve, such air then passes through conduit 26, conduit 54, and two-way check valve 48 (adjusted by reason of air under pressure in line 54 and by reason of line 46 connecting through valve 40 to the atmosphere to connect ports 48c and 48b) to line 50, whence the air under pressure flows to regulating valve 30. The air flows through this valve and line 52 into service line 18. The adjustment, therefore, has the effect of placing control valve 30 in series with the foot valve.

It will be noted from the above that by the inclusion of pressure holding valve 28, with air under pressure in pilot line 34 for the valve, the valve is adjusted so that on depressing of the treadle, air under pressure is prevented from flowing from port 28a to port 28b, with the result that two-way check valve 31 is adjusted to prevent conduit 26 from connecting with line 18 through the check valve.

It will be seen that extending between line or conduit 52 and line or conduit 50 is a conventional check valve 66. This check valve is included to permit the escape from service line 18, after the application of the trailer brakes and subsequent release of the treadle, of captured air through line 52, the check valve, line 50, line 54 and foot valve 22.

With such a series relationship existing between the foot and control valve, and assuming for purposes of explanation that the pressure of air within the tank is 100 pounds (gauge), control valve 30 may be adjusted to regulate the pressure in line 52 (and service line 18 which connects with this line) whereby it never exceeds some lesser pressure, for instance, 25 pounds. With such an adjustment made, and on operation of the foot treadle, with pressures in line 26 which are less than 25 pounds, the same pressures will be reflected in the line servicing the trailer brakes as in the line servicing the tractor brakes. With pressures in line 26 which exceed 25 pounds, such pressures will be transmitted to line 16 servicing the tractor brakes, but control valve 30 will function to limit the pressure in service line 18 for the trailer brakes to the 25-pound setting of the control valve.

With this organization the vehicle driver can use the treadle in braking the vehicle, and depending on the load conditions and road conditions, place control valve 30 at such a setting as to prevent a braking action in the trailer brakes such as might cause the brakes to lock with normal braking effort exerted on the tractor brakes.

The control valve is readily reinstated in a parallel relationship with the foot valve by manipulating on-off 60 valve so that lines 34 and 68 exhaust to the atmosphere through valve 60, and inlet port 60b is closed. With this adjustment and atmospheric pressure in line 34, lines 26 and 29 connect through valve 28. Further, relay valve 40 opens to connect inlet and outlet ports 40a, 40b. This reinstates a path for air under pressure to the control valve comprising lines 42, 44, 46 and 50.

In the ordinary tractor-trailer combination, foot valve 22 and control valve 30 are located in the cab of the tractor, where they are in a convenient position to be adjusted by the vehicle driver. It will be noted that as contemplated by the invention, valve 30 is not a relay valve, but directly controls the admission of air under pressure to the service line for the trailer brakes. This feature has been found to be important as minimizing the length of hose required in the braking system. It will also be noted that with the foot and control valves in effect in parallel, the length of hose extending between the tank or source of air under pressure to the various brakes is the same with the organization contemplated as in braking systems which do not include a control valve or any agency performing such function. A further advantage of the organization is that the various valves employed are of conventional design and readily available, which tends to minimize the cost of the installation.

As indicated earlier, the braking concept which forms the invention also may be adapted for the actuation of vacuum-operated brakes. The system is further capable of modification to enable its inclusion with vehicles of other descriptions than the truck and trailer combination specifically described herein.

While an embodiment of the invention has been described, as indicated, variations and modifications are possible, without departing from the invention. It is desired to cover all such variations and modifications as would be apparent to one skilled in the art, and that come within the scope of the appended claims.

It is claimed and desired to secure by Letters Patent:

1. In a vehicle braking system, a source of pressure maintained at a nonatmospheric level,
   a first wheel brake assembly and a first operating line connected to said assembly operable to produce actuation of the assembly with a change in pressure occurring in said line,
   conduit means connecting the source and said operating line of said first brake assembly,
   said conduit means including a variable pressure regulating valve adjustable to different positions and operable in such positions to establish a pressure which is between atmospheric pressure and the level of the pressure of said source in that portion of the conduit means which extends from the variable pressure regulating valve to said first operating line, said conduit means also including a second variable pressure regulating valve and said first and second variable pressure regulating valves being disposed in series with each other, said second variable pressure regulating valve being located toward said source from said first variable pressure regulating valve and having a downstreab side connected to said first variable pressure regulating valve, a second wheel brake assembly and a second operating line connected to the second wheel brake assembly operable to produce actuation of the second wheel brake assembly with a change in pressure occurring in said second operating line, said second operating line connecting with said conduit means at a point located toward said source from said first variable pressure regulating valve and on the downstream side of said second variable pressure regulating valve, and a foot pedal for operating said second variable pressure regulating valve operatively connected in such manner that positioning of the pedal produces adjustment in the valve.

2. The braking system of claim 1, which further includes a circuit changing valve for removing said first variable pressure regulating valve from its position in series with said second variable pressure regulating valve.

3. The braking system of claim 1 which further comprises a circuit changing valve for removing said first variable pressure regulating valve from its position in series with said second variable pressure regulating valve, and includes means for placing said first variable pressure regulating valve in parallel with said second variable pressure regulating valve, with the two valves located between said source and said first operating line.

4. In a vehicle braking system, a source of pressure maintained at a nonatmospheric level, a first wheel brake assembly and a first operating line connected to said assembly operable to produce actuation of the assembly with a change in pressure occurring in said line, conduit means connecting said source and said operating line of said first brake assembly, said conduit means including a variable pressure regulating valve adjustable to different positions and operable in such positions to establish a pressure which is between atmospheric pressure and the level of the pressure of said source in that portion of the conduit means which extends from the variable pressure regulating valve to said first operating line, a second variable pressure regulating valve disposed with said first and second variable pressure regulating valves in series with each other, a pilot-operated circuit changing valve for removing said first variable pressure regulating valve from its position in series with said second variable pressure regulating valve to leave the source connected to said first brake assembly with said first variable pressure regulating valve bypassed, a pilot line connected to and for operating the pilot-operated circuit changing valve, and a connecting line extending from said source which connects with said pilot line, said connecting line including an on-off valve controlling communication between said pilot line and said source, and a foot pedal for operating said second variable pressure regulating valve operatively connected in such manner that positioning of the pedal produces adjustment in the valve.

5. In a vehicle braking system, a source of pressure maintained at a nonatmospheric level, a first wheel brake assembly and a first operating line connected to said assembly operable to produce actuation of the assembly with a change in pressure occurring in said line, conduit means connecting said source and said operating line of said first brake assembly, said conduit means including a variable pressure regulating valve adjustable to different positions and operable in such positions to establish a pressure which is between atmospheric pressure and the level of the pressure of said source in that portion of the conduit means which extends from the variable pressure regulating valve to said first operating line, a second variable pressure regulating valve disposed with said first and second variable pressure regulating valves in series with each other, a circuit changing valve for removing said first variable pressure regulating valve from its position in series with said second variable pressure regulating valve, means whereby on such removal of said first and second variable pressure regulating valves are placed in parallel relationship with respect to each other between said source and said first operating line, and a foot pedal for operating said second variable pressure regulating valve operatively connected in such a manner that positioning of the pedal produces adjustment in the valve.

References Cited

UNITED STATES PATENTS 2,373,450  4/1945  Boldt _____ 303—8 XR

FERGUS S. MIDDLETON, *Primary Examiner.*

MILTON BUCHLER, *Examiner.*

J. J. McLAUGHLIN, *Assistant Examiner.*